E. GAIRING.
BORING TOOL.
APPLICATION FILED AUG. 8, 1919.
1,357,042.
Patented Oct. 26, 1920.
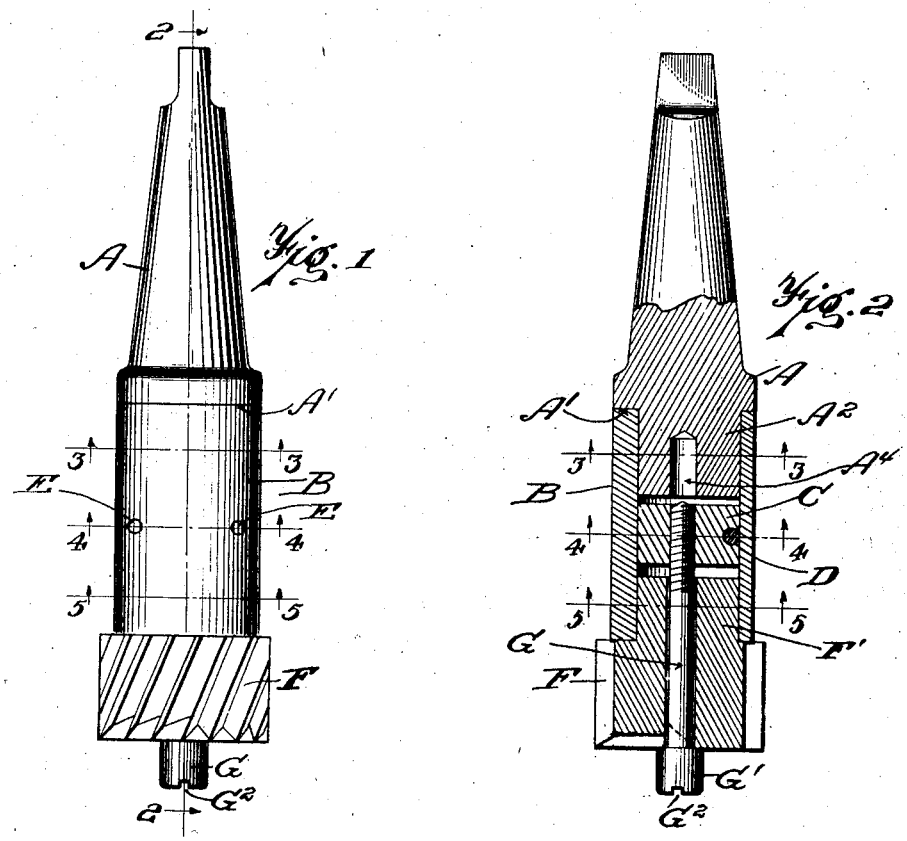
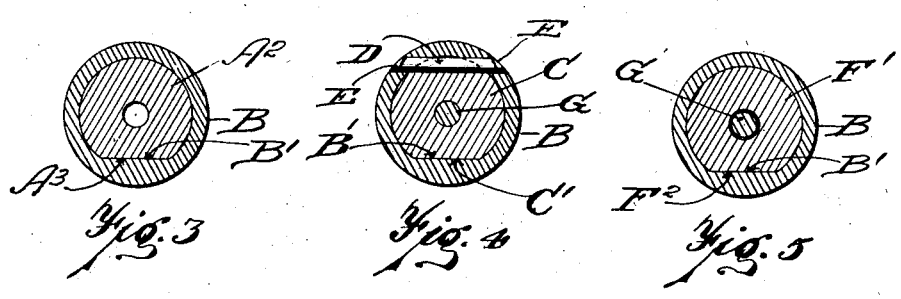

UNITED STATES PATENT OFFICE.

EMIL GAIRING, OF DETROIT, MICHIGAN.

BORING-TOOL.

1,357,042.  Specification of Letters Patent.  Patented Oct. 26, 1920.

Application filed August 8, 1919. Serial No. 316,067.

*To all whom it may concern:*

Be it known that I, EMIL GAIRING, citizen of the United States, residing at Detroit, county of Wayne, State of Michigan, have invented a certain new and useful Improvement in Boring-Tools, and declare the following to be a full, clear, and exact description of the same, such as will enable others skilled in the art to which it pertains to make and use the same, reference being had to the accompanying drawings, which form a part of this specification.

My invention relates to boring tools, and more particularly counterboring tools, shown in the accompanying drawings and described in the following specification and claims.

One object of the invention is to provide a simple and inexpensive device adapted for use on work which does not require extreme accuracy of operation.

Another object is to provide a simple and positive "driving lock" between the shank of the tool and the holder.

A further object of the invention is to provide means for securely locking the tool in the holder adapted to accommodate itself to the wear of the tool, that the latter may be securely locked in the holder irrespective of the wear of the tool.

A further object is the simplicity of construction and comparatively low manufacturing cost.

With the foregoing and other objects in view which will appear as the description proceeds, the invention resides in the combination and arrangement of parts and in the details of construction hereinafter described and claimed, it being understood that changes may be made in the precise embodiment of the invention hereinafter disclosed without departing from the spirit of the same.

In the accompanying drawings forming part of this specification:—

Figure 1 is a side elevation of the device.

Fig. 2 is a longitudinal sectional view on line 2—2 of Fig. 1.

Fig. 3 is a cross sectional view on line 3—3 of Figs. 1 and 2.

Fig. 4 is a cross-sectional view on line 4—4 of Figs. 1 and 2.

Fig. 5 is a cross-sectional view on line 5—5 of Figs. 1 and 2.

Referring now to the letters of reference placed upon the drawing:—

A, denotes a shank having a tapering portion adapted for insertion in a suitable chuck or other driving means (not shown).

A', indicates a shoulder formed in the shank between the tapering portion and a projecting stem $A^2$, having one side flattened as shown at $A^3$, in Fig. 3.

B, designates a sleeve having a flattened inner surface B', throughout its entire length, corresponding with the flattened surface $A^3$, of the shank.

The sleeve B, is "shrunk" on the projecting stem $A^2$, and is practically integral therewith.

C, denotes a nut housed in the sleeve, having a flattened outer wall C', to conform to the flattened surface B', of the sleeve.

D, indicates a pin extending transversely through the walls of the sleeve B, and through a groove in the nut C, to secure the latter to the sleeve in position to receive a pilot rod. The ends of the pin may be flush with the outer surface of the sleeve but are preferably lower and covered with solder as indicated at E, that the pin may be secured against dislodgment—see Fig. 4 of the drawing.

F, denotes a boring tool provided with a relatively short stem F', having one side flattened as indicated at $F^2$, to accommodate itself to the flattened wall B', of the sleeve.

G, is a pilot rod screwed into the nut C, having an enlarged head G', provided with a kerf $G^2$, to receive the blade of a screw driver, whereby it may be adjusted. The shoulder $G^2$, formed by the head overlaps the end of the tool and upon the adjustment of the pilot rod forces the tool against the end of the sleeve, locking it securely thereto.

$A^4$, indicates a recess in the end of the shank to receive the end of the pilot rod in order that as the tool wears away and the pilot rod is adjusted to take up the wear, the end of the pilot rod will project into the recess.

Having indicated the several parts by reference letters, the construction and operation of the device will be readily understood.

The co-acting flattened faces of the respective elements provide an efficient and positive driving connection between the tool and holder, and the overhanging head of the adjustable pilot rod serves not only to center the tool but secures it against dislodgment from the socket or sleeve of the holder.

It will also be seen that in the event of the pilot-rod breaking, the nut with which it engages may be removed by driving out the transverse pin;—the nut and broken pilot-rod may then be withdrawn and a new pilot rod, and nut, if necessary inserted at a relatively small cost.

Having thus described my invention, what I claim is:—

1. In a device of the character described, a shank portion provided with a projecting stem flattened on one side, a sleeve secured to the stem having a flattened inner surface co-acting with the flattened side of the stem, said flattened portion extending throughout the length of the sleeve, a nut housed in the sleeve having a flattened side conforming to the flattened portion of the sleeve, means for securing the nut in the sleeve, a cutter having a central bore and having a projecting stem having a flattened portion adapted to engage the flattened portion of the sleeve, and a rod passing through the bore of the cutter and threaded to engage the nut and provided with an enlarged head overlapping the end of the tool, whereby upon adjusting the rod the tool may be secured to the end of said shank.

2. In a device of the character described, a tapering shank having a projecting stem with a flattened side and of less diameter than the end of the shank from which it projects; whereby a shoulder is formed between the shank and projecting stem to receive the thrust of a sleeve, a sleeve having a flattened inner surface throughout its length fitted to the stem and secured thereto, a nut housed in the sleeve having a flat side to conform to the flattened inner surface of the sleeve, a pin extending transversely through the wall of the sleeve and through a groove in the nut, to secure the latter against dislodgment, a cutter having a central bore and having a shank adapted to enter the end of the sleeve and to conform to the flattened portion of the latter, and a rod passing through the bore of the cutter and threaded at one end to engage the nut and at the other end provided with an enlarged head overlapping the end of the tool, whereby upon being adjusted the tool may be securely held against the end of the sleeve portion.

In testimony whereof I sign this specification in the presence of two witnesses.

EMIL GAIRING.

Witnesses:
S. E. THOMAS,
JOHN CONSIDINE, Jr.